Dec. 31, 1929.                    W. B. SIMONS                    1,741,543
        RASPING DRUM FOR DECORTICATING MACHINES AND PROCESS OF DECORTICATING
                              Filed Dec. 10, 1925
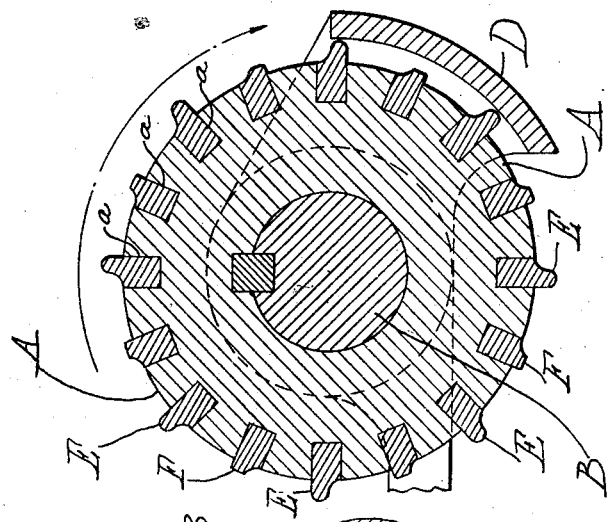
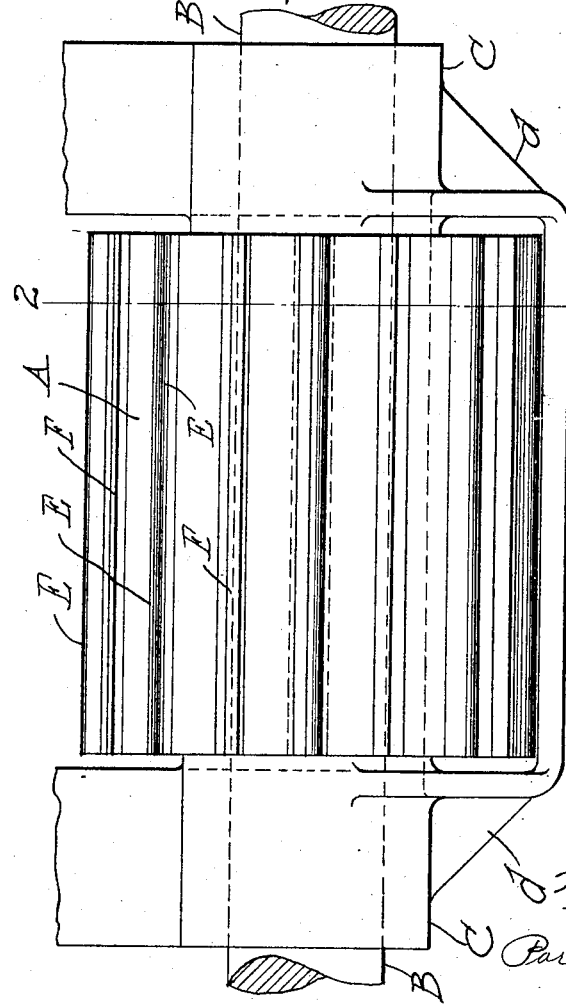

Patented Dec. 31, 1929

1,741,543

UNITED STATES PATENT OFFICE

WALTER B. SIMONS, OF BUFFALO, NEW YORK, ASSIGNOR TO THE GEO. L. SQUIER MFG. CO., OF BUFFALO, NEW YORK

RASPING DRUM FOR DECORTICATING MACHINES AND PROCESS OF DECORTICATING

Application filed December 10, 1925. Serial No. 74,452.

This invention relates to decorticating machines of the kind into which the part of the plant which is to be operated upon is inserted lengthwise, and after the decorticating operation has been completed the fibers are again withdrawn lengthwise in the opposite direction.

Machines of this kind as heretofore made have been large and expensive for the reason that rasping wheels or drums of considerable diameter have been found necessary, and attempts to use wheels of smaller diameter have been unsuccessful for the reason that the fibers would tend to wind themselves around the wheel. The expense of these machines was further increased by the necessity of providing means for mechanically gripping or holding the leaves or other parts of the plants to be decorticated, since the pull exerted on the part of the plant by the large wheel and correspondingly large rasping plate made it impossible for an operator to hold the leaves or plant parts by hand. Furthermore these machines caused a loss of all or a large part of the short fibers of the plants, and were therefore inefficient and wasteful in their operation.

The objects of my invention are to provide a rasping drum or wheel for a decorticating machine or apparatus which wheel or drum is of small diameter and is so constructed that even if long fibers are fed endwise between this wheel and the rasping plate with which the wheel cooperates, there will be no tendency of the wheel to wind the fibers around itself; also to provide a rasping drum or wheel for a machine of this kind by means of which leaves or parts of a plant can be operated upon without loss of short fibers; also to provide an improved process for removing or rasping the non-fibrous material of a part of a plant from the fibers thereof; also to improve the construction of machines of this kind and rasping processes in other respects hereinafter specified.

In the accompanying drawings,

Fig. 1 is a top plan view of the rasping wheel or roll and rasping plate of a decorticating apparatus embodying my invention.

Fig. 2 is a transverse, sectional elevation thereof on line 2—2, Fig. 1.

A represents a rasping roll, drum or wheel of a decorticating machine which is mounted on a shaft B, which may be driven by any suitable means, and which is journalled in bearings C arranged at opposite sides of the rasping drum A. This rasping drum is provided with rasping knives or projections extending beyond the periphery thereof and which are adapted to operate in close proximity to a stationary segmental rasping plate D which is arranged concentric with the axis of the rasping drum, the clearance between the ends of the projections and the rasping plate being as usual just sufficient to permit fibers to occupy this space without damage from the knives or projections. The plate in this particular construction shown is integrally connected with the bearings C by means of side arms or portions $d$, but it will be understood that any suitable means for holding this rasping plate D in operative relation to the rasping drum or wheel may be employed.

Rasping drums or wheels if this kind have heretofore been employed in which all of the rasping knives or ribs were substantially the same height and these rasping wheels or drums, if made of small diameter, were found to have the property of winding the fiber, which had been decorticated, around the roll so that it was necessary to stop the machine and clear the fiber from the drum before the same could again be used. I have found that by making these knives of alternately different heights, this difficulty can be entirely overcome. For this purpose the rasping knives or projections E, which accomplish the effective rasping or decorticating of the fiber, are arranged alternately with knives F which are of considerably less height than the rasping knives E. The edges or outer portions of the rasping knives E are preferably rounded so as to have no tendency to cut or break the fiber which is being rasped, and the knives or projections F may be made blunt and provided with fairly sharp edges, and extend far enough from the inner face of the rasping plate D so as to have either very little or no rasping action. Experiments made in obtaining sisal fiber from the leaves of a sisal plant have proven that the presence of these low knives F between the rasping knives E prevents the fibers from winding around the rasping drum or wheel A.

As a result of this construction a leaf or part of the plant to be rasped, such for example as a leaf of a sisal plant, may be fed endwise to the machine between the rasping plate D and the rasping drum or wheel A, in such a manner that the point of the leaf enters first into this space. The feeding of the leaves or parts of the plant to be decorticated may be effected either by hand or by mechanical feed means. The machine will have a slight tendency to draw the leaf into the machine and the knives E will effectually remove the pulp and other material from the fibers. This leaf or part of the plant may be fed into the machine until all but a small portion thereof has been rasped whereupon all of the fibers can be withdrawn by merely pulling the same out of the apparatus in the opposite direction. This operation also has the advantage that the fibers pass twice into the space between the revolving knives of the rasping wheel or drum A and the rasping plate D so that a thorough cleansing of the fibers results. During the first passing of the fibers through this space a thorough cleaning of the fibers is not effected, since particles of pulp and bark adhere to the fibers and because of their sticky nature, cause the fibers to adhere more or less to each other so that the mass of fibrous material which has passed through the machine and the non-fibrous material adhering thereto is comparatively heavy and hangs down from the lower edge of the rasping plate D and has no tendency to wind itself around the rasping drum. The final cleaning of the fibers takes place when they are drawn through the space between the roll and rasping plate for the second time. The short knives F spaced between the longer knives E prevent the thorough cleaning of the fibers in passing through this space for the first time but effect a more thorough breaking up or loosening of the fibers during this first passing through the space. A machine of this kind can be driven by very much less power than has heretofore been required for the larger machines commonly used for this purpose and the action of the machine is practically as quick as that of larger machines, and the capacity of the machine is therefore practically equal to that of larger machines heretofore used. The machine has, however, the great advantage that the leaf or part of the plant to be decorticated may be passed lengthwise into the machine until practically the entire length of the leaf has been acted upon by the machine. This is of great importance in the leaves of many fiber producing plants, in which all of the fibers extend from the base of the leaf to the barbs at the edges and ends of the leaves. Consequently the length of the fibers varies greatly since each fiber extends to a barb of the leaf and the barbs are located all along the two edges of the leaf from end to end thereof, and in machines of the kind heretofore used in which the upper half of the leaf was first inserted into the machine and then reversed so that the fibers which have been decorticated were grasped while the lower end of the leaf was decorticated, resulted in the loss of all the short fibers which terminate in barbs on the lower half of the leaf.

The rasping knives or projections may be formed on the drum or wheel in any suitable manner. In the construction shown, the drum A is provided with longitudinally extending grooves a, Fig. 2 in which the knives E and F are secured in any suitable manner, not shown. Consequently if any of the knives become worn, they may be removed and replaced by others.

I claim is my invention:—

1. A rasping drum for a decorticating machine provided with a plurality of rigid blunt rasping projections extending lengthwise of said drum and into such proximity to a rasping plate that single fibers can just occupy this space without damage to the fibers by said projections, and a plurality of rigid projections arranged alternately with said rasping projections and extending at a greater distance to said rasping plate and serving to permit part of the non-fibrous material to adhere to the fibers during the first passage of said fibers through the space between said drum and said plate to prevent fibers from winding around said drum.

2. The combination of a rasping drum of small diameter having rigid blunt projections on the outer face thereof which extend alternately to different distances from the body portion of said drum, and a rasping plate having a surface substantially concentric with said drum and which is arranged in such close proximity to the projections which extend to a greater distance from the body portion of said drum as to just permit single fibers to pass between said plate and projections, the other projections serving to permit part of the non-fibrous material to adhere to the fibers during the first passage of said fibers through the space between said drum and said plate to keep fibers from winding around said drum.

3. A rasping drum for a decorticating machine provided with a plurality of rasping projections extending lengthwise of said drum and into close proximity to a rasping plate, and a plurality of projections arranged alternately with said rasping projections and extending at a greater distance to said rasping plate, the distance between said projections and said drum being such that the parts of the plants to be acted upon may be fed lengthwise into the space between said drum and said plate to effect the rasping of the fibers without removing all of the non-fibrous material therefrom, and are then withdrawn in the opposite direction to effect further cleaning of the fibers, whereby tendency of the fibers to wind around said drum is eliminated by weighing down the fibers with non-fibrous material during the first passage of said material into said space.

4. The process of removing non-fibrous material from the fibers of plants, which consists of exposing a part of a plant to the beating action of a toothed drum rotating in close proximity to a plate, by passing a part of the plant lengthwise between the drum and plate in the direction of rotation of the drum to cause said drum to break up and crush non-fibrous material of the part of the plant and to remove a part only of said non-fibrous material from the fibers of the plant, the non-fibrous material adhering to the fibers serving to cause the fibers to adhere to each other and then drawing said plant part in the opposite direction between said drum and plate to cause the removal of non-fibrous material from the fibers.

5. A process of removing non-fibrous material from the fibers of plants which consists of feeding a part of a plant lengthwise in one direction between a rapidly revolving toothed drum of small diameter and a plate to subject the part of the plant to a beating action to break up, loosen, and remove a part of the non-fibrous material in said plant part, causing the remaining portions of non-fibrous material to hold the fibers together and prevent winding of the same around said drum and then drawing said plant part through the space between said drum and plate in the opposite direction to remove the broken particles of non-fibrous material from the fibers.

WALTER B. SIMONS.